United States Patent

[11] 3,624,775

| [72] | Inventor | Melvin V. Gaeddert |
| | | Newton, Kans. |
| [21] | Appl. No. | 876,028 |
| [22] | Filed | Nov. 12, 1969 |
| [45] | Patented | Nov. 30, 1971 |
| [73] | Assignee | Hesston Corporation |
| | | Hesston, Kans. |

[54] KNEE ACTION CONTROL FOR ROTOR TINE BARS
7 Claims, 5 Drawing Figs.

[52] U.S. Cl. .................................................. 198/211, 56/375
[51] Int. Cl. ........................................ B65g 29/00, A01d 77/04
[50] Field of Search .......................................... 198/211, 204; 56/12.4, 364, 375

[56] References Cited
UNITED STATES PATENTS
3,282,408  11/1966  Lohrentz ...................... 198/211

*Primary Examiner*—Joseph Wegbreit
*Attorney*—Schmidt, Johnson, Hovey & Williams ABSTRACT: Knee action linkage is provided to control the tine bars or shafts for rotating cylinders, drums or the like. The linkage simulates the control action of a cam and is designed to control the tine bars so as to maintain a desired position for maximum pickup and feeding ability. A main or primary link is actuated by an offset crank arm. Attached to the main link are two follower links which interconnect the tine bar and the drum. When the drum is rotated, and because the crank arm is held stationary, a unique tine position relative to drum rotation occurs. The tines are caused to remain extended for a considerable period of drum rotation; then at a certain point in the rotation the tine bars rotate about their axes very abruptly, while the drum continues to rotate only a relatively few degrees. This has the effect of leaving the fingers or tines in an extended position for a longer period of time, which is most desirable and very necessary when applied to pickup reels, feeder beaters, auger conveyors, and rotary windrow pickups. The simplified linkage actuated by a crank arm on a fixed axle eliminates the need for a cam track and cam follower bearings which require lubrication and are very noisy in operation, yet function and finger action are duplicated as when controlled by a cam.

PATENTED NOV 30 1971

3,624,775

INVENTOR.
Melvin V. Gaeddert
BY Schmidt, Johnson, Hovey,
Williams & Chase
ATTORNEYS.

KNEE ACTION CONTROL FOR ROTOR TINE BARS

It is the most important object of the present invention to provide a rotatable, tined cylinder having knee action linkage for swinging the tines during rotation of the cylinder from an extended to a folded position, such action being effected by revolving one end of one of the links around the axis of rotation of the rotor while holding the axis of rotation of another link fixed in a position eccentric to such axis of the rotor.

Another important object of the present invention is to impart a scissors or knee action motion to toggle linkage for oscillating a shaft on the rotor to which the tines are affixed, all for the purpose of providing a desired and advantageous finger position without need for a cam control.

Figure 1:
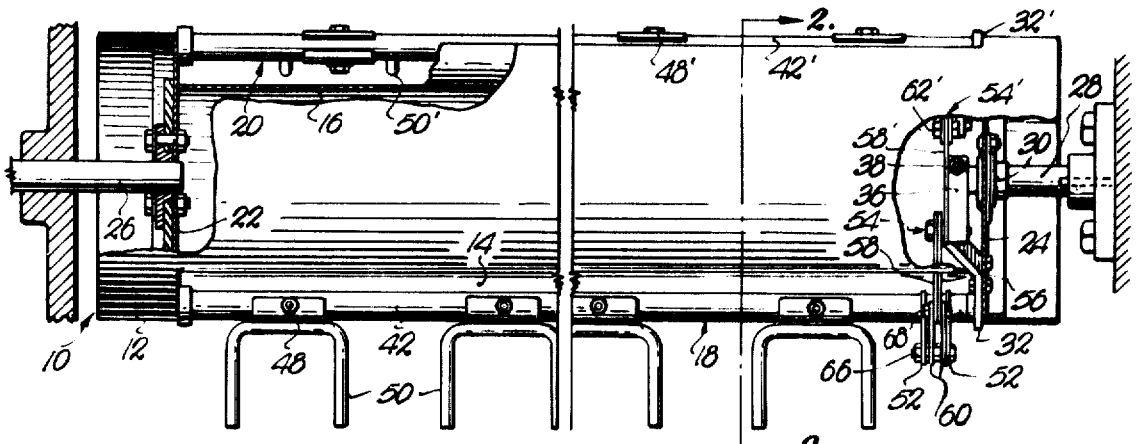
FIG. 1 is an elevational view of a rotor having a knee action control for the tine bars thereof made pursuant to my present invention, parts being broken away and in section to reveal details of construction.
Figure 2:
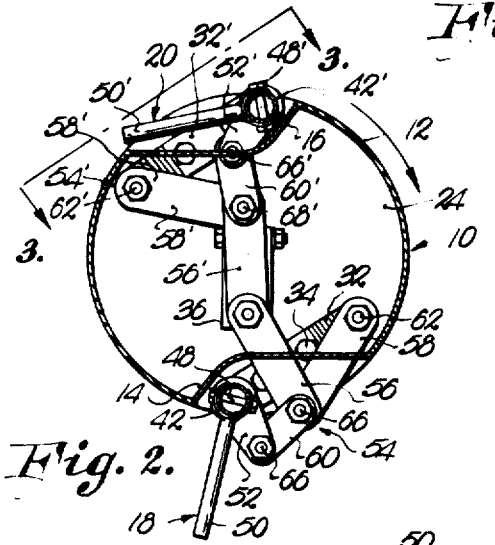
FIG. 2 is a cross-sectional view taken on line 2—2 of FIG. 1.
Figure 3:
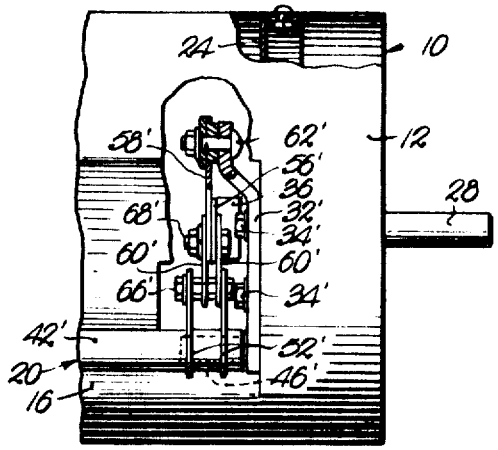
FIG. 3 is an enlarged, fragmentary elevational view taken essentially on line 3—3 of FIG. 2, parts being broken away to reveal details of construction.

A rotor 10 includes a cylindrical shell 12 interrupted by a pair of longitudinally extending, diametrically opposed depression 14 and 16 corresponding to a pair of tine assemblies 18 and 20. A pair of bulkheads 22 and 24 rigid to the shell 12 therewithin have central stub axles 26 and 28 extending outwardly therefrom. The axles 26 is rigid to the bulkhead 22 and is not only adapted to be rotatably supported but to be driven so as to drive the rotor 10 about the aligned, normally horizontal axes of the axles 26 and 28. The bulkhead 24 is rotatably supported by the axle 28 through a bearing 30, and the axle 28 is adapted for rigid support so as to be nonrotating. A first crank arm 36, common to the assemblies 18 and 20, is releasably attached to the axle 28 by a bolt 38 and a key 40.

Since the assemblies 18 and 20 are identical, only one will be described, the corresponding parts of the assembly 20 being designated by the same reference numerals but appropriately primed. The assembly 18 includes a bar 32 having a chord like disposition and releasably attached to the bulkhead 24 for rotation therewith by bolts 34. An oscillatory shaft 42 within the depression 14 is parallel to the axis of rotation of the rotor 10 and carried by the bulkhead 22 through a stub pin 44. A similar pin 46' attaches the shaft 42 to the bar 32. The shaft 42 has a row of U-shaped elements releasably secured at their bights to the shaft 42 by clamps held in place by bolts 48 and each provided with a pair of tines 50. A second crank arm 52, in the nature of a pair of plates, rigid to the shaft 42.

Toggle linkage 54 pivotally interconnects the arm 36, the arm 52 and the rotor 10. It includes a primary link 56 and a pair of secondary links 58 and 60, the latter of which is in the nature of a pair of plates. Link 58 has a pivot 62 swingably connecting it with the bar 32; the links 56 and 56' have a common pivotal connection 64 with the arm 36; and a pivot 66 pivotally joins the link 60 with the arm 52. A trunnion 68 is common to the three links 56, 58 and 60.

Figure 4:
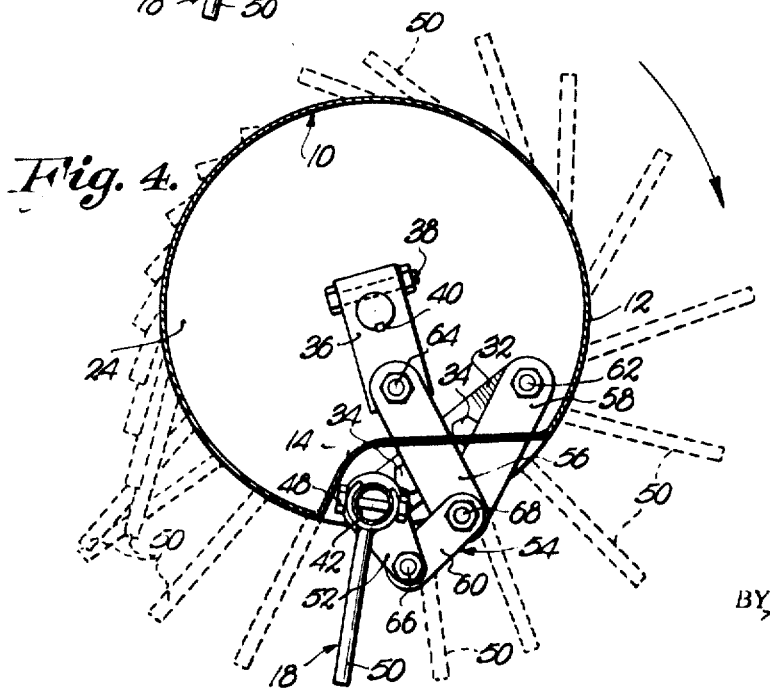
FIG. 4 is an enlarged cross-sectional view similar to FIG. 2, illustrating but one of the assemblies and showing the finger pattern.
Figure 5:
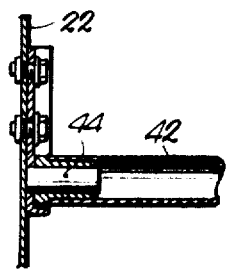
FIG. 5 is a fragmentary, detailed cross-sectional view at one end of one of the finger shafts illustrating its manner of mounting.

While the relationship of the tines 50 to the shell 12 is ever changing during rotation of the rotor 10, it is to be noted in FIG. 4 that the tines 50 extend outwardly from the shell 12 for a considerable period of time during the cycle of rotation of the shell 10. But the tines 50 are quickly folded fully back within the depression 14 after the link 56 commences to withdraw the trunnion 68 toward the axle 28.

In effect, since the pivot 64 remains fixed (radially spaced downwardly from the axle 28) the links 56 and 56' rotate around the pivot 64 as the pivot 62 and 62' revolve around the arm 36 with the shaft 28 as their axis. As a result, the links 56 and 56' impart a push-pull motion to the trunnions 68 and 68' to swing the links 58, 60 and 58', 60' in and out. This scissors or knee action on the part of the links 56, 60 and 58', 60' creates the aforementioned oscillation of the shafts 42 and 42' and, therefore, the swinging of the tines 50 and 50' as illustrated.

Thus, if the unit is to be used, for example, to pick up material, such as hay in a windrower, the tines 50 will be subjected to the hay for a considerable distance of rotation of the rotor 10 and then quickly release the hay to a point of deposit be relatively close to the rotor 10 because of the close-in folding of tines 50.

Having thus described the invention, what is claimed as new and desired to be secured by Letters Patent is:

1. In combination with a rotor having a fixed axle around which the same rotates, an oscillatory shaft carried by the rotor, a tine mounted on the shaft for swinging movement relative to the rotor from an outwardly extending position to a folded back position during oscillation of the shaft, and structure operably interconnecting the axle and the shaft for oscillating the latter to swing the tine to each of said positions during each cycle of rotation of the rotor, said structure including:

a first crank arm rigid to said axle; and
   a second crank arm rigid to the shaft; and
   toggle linkage pivotally interconnecting the rotor and the arms, 2. The invention of claim 1, said linkage including a primary link having a pivot connecting the same with the first arm, for rotation of the primary link around said pivot during rotation of the rotor around said axle, said pivot being spaced radially outwardly from said axle.

3. The invention of claim 2, said linkage including a pair of pivotally interconnected secondary links pivotally connecting the primary link with the arms and the rotor.

4. The invention of claim 3; and a second pivot secured to the rotor for rotation therewith around the first arm and about the axle as its axis,
   one of said secondary links being pivotally connected with said second pivot.

5. The invention of claim 4; a third pivot interconnecting the second arm and the other of said secondary links.

6. The invention of claim 5; and a trunnion common to the secondary links pivotally coupling the same with the primary link.

7. The invention of claim 6; and a bar fixed to the rotor in chordlike disposition for rotation therewith,
   said shaft being carried by the bar for oscillation at one end of the bar,
   said second pivot being carried by the bar at the opposite end of the latter.

* * * * *